(12) United States Patent
Leonardi et al.

(10) Patent No.: US 11,108,303 B2
(45) Date of Patent: Aug. 31, 2021

(54) ELECTRIC MACHINE END TURN CHANNELS

(71) Applicant: FORD GLOBAL TECHNOLOGIES, LLC, Dearborn, MI (US)

(72) Inventors: Franco Leonardi, Dearborn Heights, MI (US); Prasad Dev Hanumalagutti, Dearborn, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 934 days.

(21) Appl. No.: 15/243,407

(22) Filed: Aug. 22, 2016

(65) Prior Publication Data

US 2018/0054107 A1 Feb. 22, 2018

(51) Int. Cl.
| | | |
|---|---|---|
| *H02K 1/20* | (2006.01) | |
| *H02K 9/193* | (2006.01) | |
| *H02K 7/00* | (2006.01) | |
| *H02K 5/20* | (2006.01) | |

(52) U.S. Cl.
CPC ............... *H02K 9/193* (2013.01); *H02K 1/20* (2013.01); *H02K 5/20* (2013.01); *H02K 7/006* (2013.01); *B60L 2210/10* (2013.01); *B60L 2210/30* (2013.01); *B60L 2210/40* (2013.01); *B60L 2220/14* (2013.01); *B60L 2220/50* (2013.01); *B60L 2240/36* (2013.01); *B60L 2240/425* (2013.01); *Y02T 10/64* (2013.01); *Y02T 10/72* (2013.01)

(58) Field of Classification Search
CPC .. H02K 5/00; H02K 9/20; H02K 1/20; H02K 5/20; H02K 9/193; H02K 3/04; H02K 1/04; H02K 9/00; H02K 9/19
See application file for complete search history.

(56) References Cited

U.S. PATENT DOCUMENTS

| | | | |
|---|---|---|---|
| 6,339,268 B1 | 1/2002 | Kaminski et al. | |
| 6,628,020 B1 | 9/2003 | Tong | |
| 7,705,508 B2 | 4/2010 | Dooley et al. | |
| 8,247,933 B2* | 8/2012 | Dang | H02K 1/20 |
| | | | 310/54 |
| 8,487,489 B2* | 7/2013 | Palafox | H02K 3/24 |
| | | | 310/52 |
| 8,508,083 B2* | 8/2013 | Sheeran | H02K 3/30 |
| | | | 310/45 |
| 8,686,605 B2* | 4/2014 | Takahashi | H02K 9/19 |
| | | | 310/54 |

(Continued)

FOREIGN PATENT DOCUMENTS

DE 102010003686 A1 * 10/2011 ............... H02K 3/24

OTHER PUBLICATIONS

DE 102010003686 A1 machine translation, Nov. 27, 2018.*

*Primary Examiner* — Tran N Nguyen
*Assistant Examiner* — Leda T Pham
(74) *Attorney, Agent, or Firm* — David B. Kelley; Brooks Kushman P.C.

(57) ABSTRACT

An electric machine includes a stator with a core having an end face and a plurality of conductors forming windings that extend adjacent to the end face defining end turns having a toroidal outline. The end turns are formed to define at least one channel in the end turns that traverses the end turns for increasing a surface area for fluid contact and directing a flow of fluid along the toroidal surface.

11 Claims, 6 Drawing Sheets

(56) References Cited

U.S. PATENT DOCUMENTS

| | | | |
|---|---|---|---|
| 2008/0017354 A1* | 1/2008 | Neal | H01F 27/10 165/104.14 |
| 2011/0156508 A1* | 6/2011 | Minemura | H02K 9/193 310/54 |
| 2011/0316367 A1* | 12/2011 | Takahashi | H02K 3/24 310/54 |

* cited by examiner

FIG. 11

ELECTRIC MACHINE END TURN CHANNELS

TECHNICAL FIELD

This application generally relates to thermal management of electric machines.

BACKGROUND

Electric machines find many uses in industry and transportation. Electric machines create torque based on a current that passes through windings. As current passes through the windings, power is lost due to the resistance of the windings. The power loss is in the form of generated heat which causes the temperature of the electric machine to rise. The rise in temperature can cause changes in the operating properties of the electrical machines.

SUMMARY

An electric machine includes a stator. The stator includes a core having an end face and a plurality of conductors forming windings that extend adjacent to the end face and defining end turns having a toroidal outline. The end turns are formed to define at least one channel that traverses the conductors for increasing a surface area for fluid contact and directing a flow of fluid along the toroidal outline.

An electric machine includes a stator. The stator includes a core defining an end face, a plurality of conductors forming windings that extend adjacent to the end face and defining end turns, and insulating elements and binding elements disposed in contact with the conductors. The end turns are formed to define at least one channel that traverses a surface that includes the conductors, the insulating elements, and the binding elements.

A vehicle includes an electric machine. The electric machine includes a stator with a core having an end face. The stator further includes a plurality of conductors forming windings that extend adjacent to the end face and defining end turns having a toroidal outline. The end turns are formed to define at least one channel in the toroidal outline. The vehicle further includes a cooling system configured to distribute a cooling medium in the at least one channel.

BRIEF DESCRIPTION OF THE DRAWINGS

FIG. 10 is a top view of an annular surface of the end turns of an electric machine in which multiple channels are defined at a common radial distance with gaps in between.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
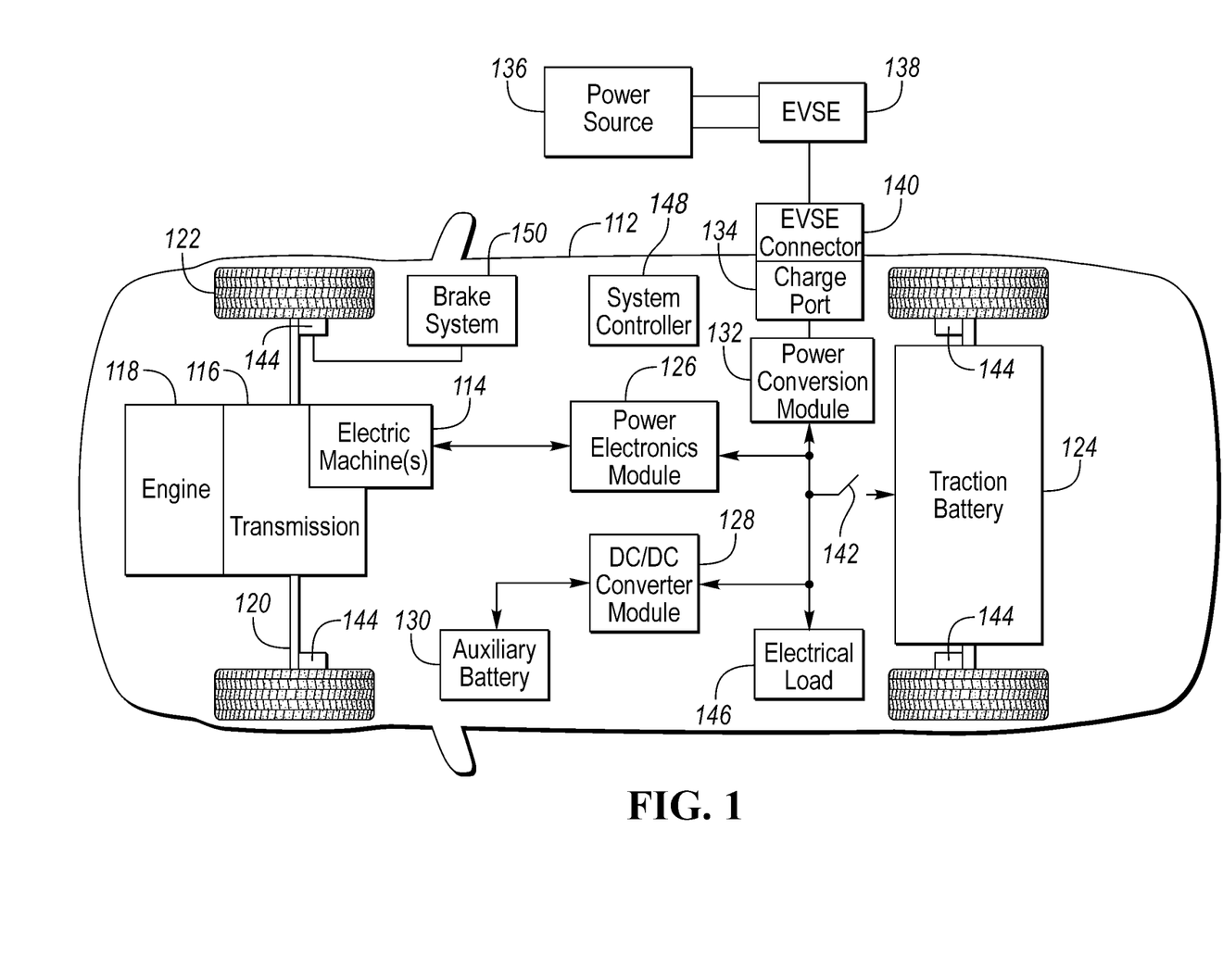
FIG. 1 is a diagram of a hybrid vehicle illustrating typical drivetrain and energy storage components.

FIG. 1 depicts a typical plug-in hybrid-electric vehicle (PHEV). A typical plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions.

A traction battery or battery pack 124 stores energy that can be used by the electric machines 114. A vehicle battery pack 124 typically provides a high voltage direct current (DC) output. The traction battery 124 may be electrically coupled to one or more power electronics modules. One or more contactors 142 may isolate the traction battery 124 from other components when opened and connect the traction battery 124 to other components when closed. The power electronics module 126 may also be electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124. The description herein is equally applicable to a pure electric vehicle. For a pure electric vehicle, the hybrid transmission 116 may be a gear box connected to an electric machine 114 and the engine 118 may not be present.

In addition to providing energy for propulsion, the traction battery 124 may provide energy for other vehicle electrical systems. A vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery). The low-voltage systems may be electrically coupled to the auxiliary battery. Other high-voltage loads 146, such as compressors and electric heaters, may be coupled to the high-voltage output of the traction battery 124. The electrical loads 146 may have an associated controller that operates and controls the electrical loads 146 when appropriate.

The vehicle 112 may be an electric vehicle or a plug-in hybrid vehicle in which the traction battery 124 may be recharged by an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system connections may be hydraulic and/or electrical. The brake system 150 may include a controller to monitor and coordinate operation of the wheel brakes 144. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Figure 2:
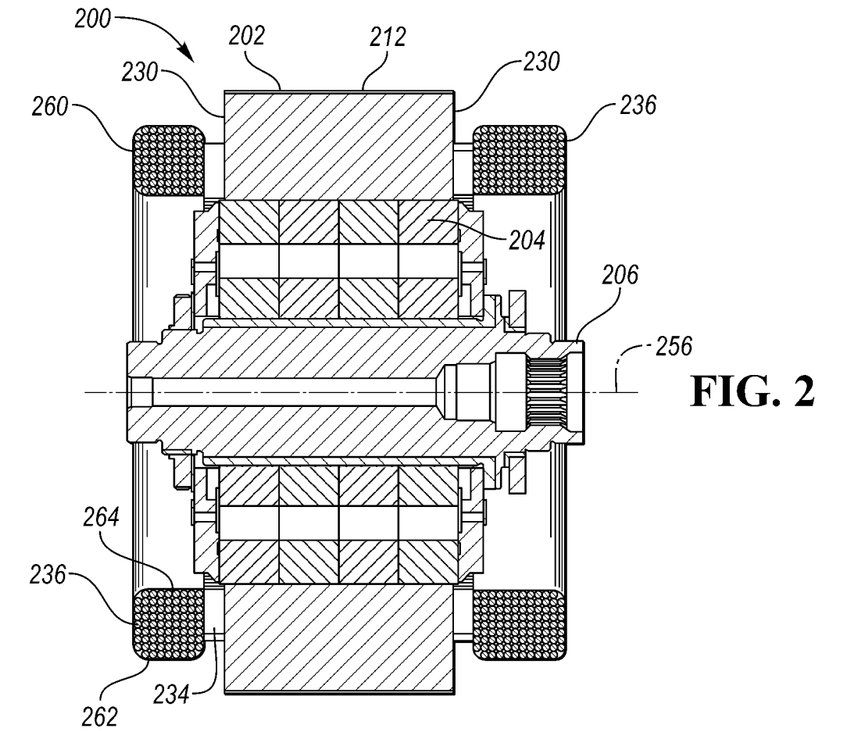
FIG. 2 is a side view, in cross section, of an example electric machine.
Figure 3:
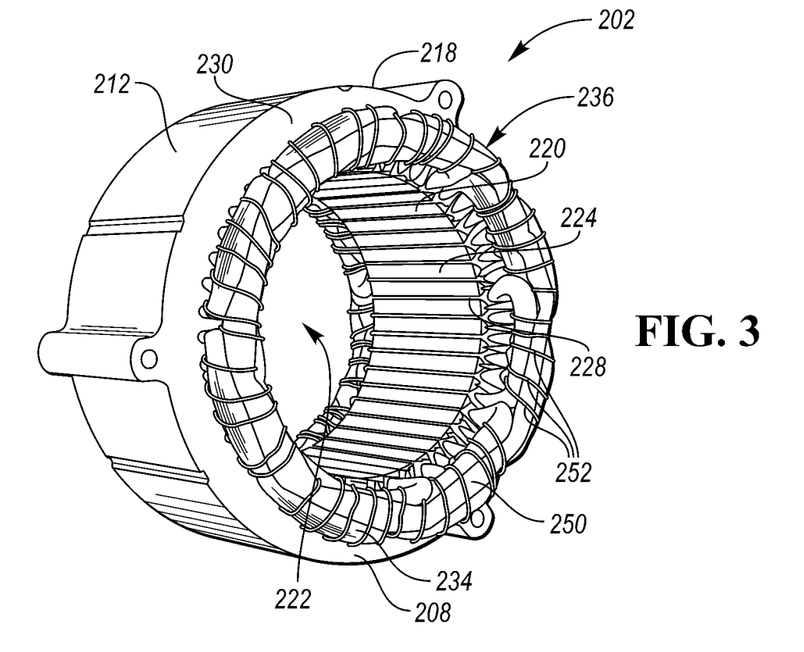
FIG. 3 is a perspective view of a stator of an electric machine.
Figure 4:
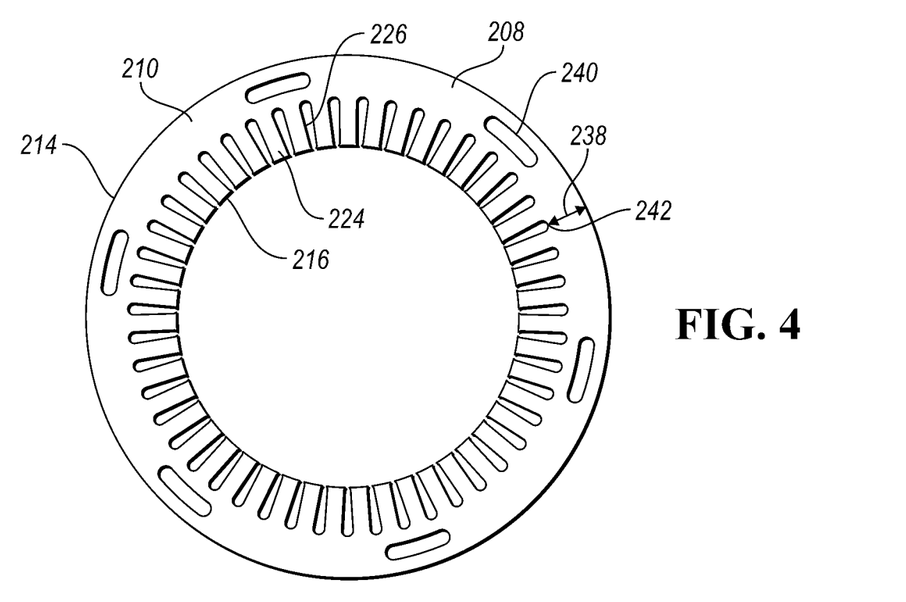
FIG. 4 is a top view of a stator lamination.

Referring to FIGS. 2, 3, and 4 an example electric machine 200 includes a stator 202 having a plurality of laminations 208. Each of the laminations 208 includes a front side 210 and a back side. When stacked, the front and back sides are disposed against adjacent front and back sides to form a stator core 212. Each of the laminations 208 may be toroidal or doughnut shaped and may define a hollow center. Each lamination 208 defines an outer diameter 214 and an inner diameter 216. The outer diameters 214 cooperate to define an outer surface 218 of the stator core 212, and the inner diameters 216 cooperate to define an outer surface 218 that forms a wall of a cavity 222.

Each lamination 208 includes a plurality of teeth 224 extending radially inward toward the inner diameter 216. Adjacent teeth 224 cooperate to define slots 226. The teeth 224 and the slots 226 of each lamination 208 are aligned with adjacent laminations to define stator slots 228 extending through the stator core 212 between the opposing end faces 230. The end faces 230 define the opposing ends of the core 212 and are formed by the first and last laminations of the stator core 212. Each of the end faces 230 has a radial length measured between the outer surface 218 and the inner surface 220. A plurality of conductors form a plurality of windings 234 (also referred to as coils, wires, or conductors) that are wrapped around the stator core 212 and are disposed within the stator slots 228. The windings 234 are typically made of copper, but other conductive material may be suitable. The end turns 236 may form a toroid-shape about a central axis 256 that coincides with a rotor shaft 206. Portions of the windings 234 generally extend in an axial direction (e.g., parallel to central axis 256) along the stator slots 228. At the end faces 230 of the stator core, the windings bend to extend circumferentially around the end faces 230 of the stator core 212 forming the end turns 236.

Insulating elements 250 may be disposed on and/or between some of the conductors of the windings 234 to isolate conductive surfaces from one another. For example, the insulating elements 250 may provide isolation between the stator core 212 and the conductors 234 in the slots 226 and may provide isolation between the phases formed by the windings 234. The insulating elements 250 may be comprised of a non-conductive material. Binding elements 252 may be disposed in contact with some of the conductors of the windings 234 and the insulating elements 250 to hold the assembly in a predetermined shape or position. The binding elements 252 may be comprised of a non-conductive material.

A rotor 204 is disposed within the cavity 222. The rotor 204 is fixed to the rotor shaft 206 that may be operably connected to a gearbox. When current is supplied to the windings 234 of the stator 202, a magnetic field is created causing the rotor 204 to spin within the stator 202 generating a torque that is supplied to the gear box via one or more shafts.

Each of the laminations 208 may include a yoke region 238 defined between the outer diameter 214 and a valley 242 of the slots 226. A plurality of fluid apertures 240 may be defined in the yoke region 238 of each of the laminations 208. The apertures 240 may extend between the front side 210 and the backside providing a void completely through the lamination 208. The apertures 240 may be slots (as shown) or may be another shape. When stacked, the apertures 240 of each lamination 208 may be aligned with adjacent laminations to define cooling channels extending through the stator core 212 between the end faces 230.

The general surface shape formed by the end turns 236 may be described as a toroid shape. The surfaces of the end turns 236 may define a toroidal outline. The toroid-shape/outline description is intended to cover any ring-like shape in which the end turns 236 may be formed. The end turns 236 may define a side or annular surface 260 that is generally parallel to the end face 230. A face of the annular surface 260 may be oriented in a direction facing away from the end face 230 of the electric machine. An outer-circumferential surface 262 and an inner-circumferential surface 264 may be defined based on a radial distance from the central axis 256. The inner-circumferential surface 264 may be a radial surface that faces toward or is generally closest to the rotor 204 and the central axis 256. The outer-circumferential surface 262 may be that radial surface that faces away from or is generally furthest from the rotor 204 and central axis 256. The outer-circumferential surface 262 and the inner-circumferential surface 264 may be oriented such that the surfaces are generally perpendicular to the associated end face 230. The outer-circumference surface 262 and the inner-circumferential surface 264 may be concentric.

Figure 5:
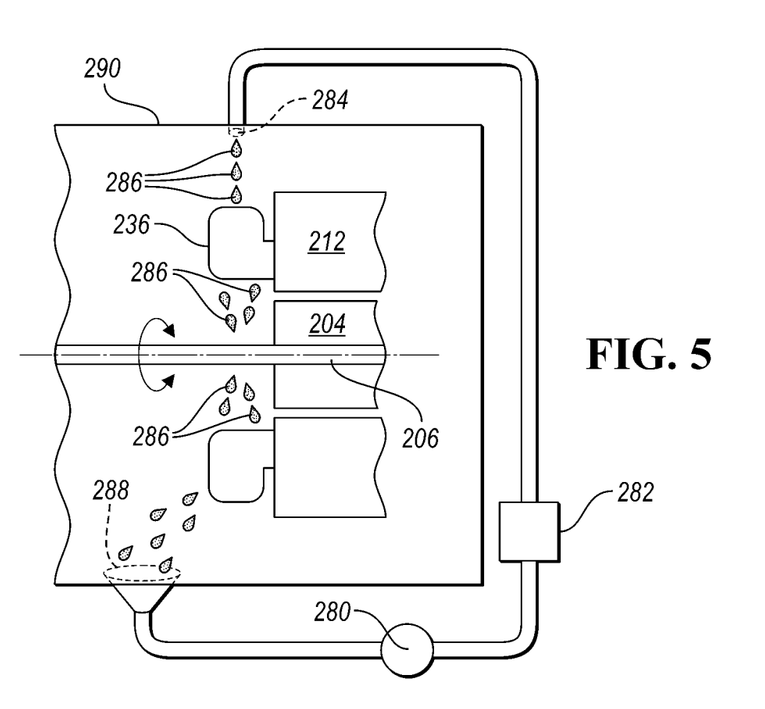
FIG. 5 depicts a possible cooling system for an electric machine.

During operation, the electric machine 200 generates heat within the stator core 212 and the windings 234. Heat is created in the windings 234 by current flow through the conductors/windings 234. To prevent overheating of the electric machine 200, a mechanism for removing heat generated during operation is desirable. FIG. 5 depicts an example of an electric machine cooling system. The electric machine 200 may be mounted in a transmission housing 290. A cooling medium 286 (e.g., transmission oil) may be employed to facilitate heat transfer from the electric machine 200. The cooling medium 286 may be an oil or fluid that is passed over the windings 234 to transfer heat from the windings 234. In some configurations, a pump 280 may be used to pressurize the cooling medium 286 and spray the cooling medium 286 onto the windings 234. Orifices or nozzles (e.g., 286) may be defined at various locations relative to the windings 234 to drip or spray the cooling medium 286 onto the windings 234. Note that FIG. 5 only depicts a single orifice or nozzle for directing cooling medium 286 into the transmission housing 290 but additional orifices or nozzles may be present. In some configurations, rotation of the rotor shaft 206 may be harnessed to splash the windings 234 with the cooling medium 286. After coming in contact with the windings 234, the cooling medium 286 may eventually flow to a collection point 288 within the transmission housing 290. The collection point 288 may be located at a lowermost position of the transmission housing 290 to ensure that the cooling medium 286 is circulated effectively. In addition, surfaces within the transmission housing 290 may be sloped toward the collection point 288 to move the cooling medium 286 toward the collection point 288. The collection point 288 may include an orifice that allows the pump 280 to draw the cooling medium 286 from the transmission housing 290. From the collection point 288, the cooling medium 286 may be flowed to a radiator 282 or other cooling mechanism to reduce the temperature of the cooling medium 286. The pump 280 may cause the cooling medium 286 to flow through lines of the cooling system to transfer heat to and from the cooling medium 286.

Heat may be transferred to the cooling medium 286 through contact with the end turns 236. As the cooling medium 286 flows over the end turns 236, heat is transferred to the cooling medium 286. As the end turns 236 extend from the end faces 230, there may be more exposed surface area than other parts of the windings 234. The cooling medium 286 may be sprayed, dripped or otherwise flowed on to the end turns 236. The end turns 236 may be configured to maximize the surface area of the end turns 236 to ensure maximal cooling effect.

To improve heat transfer from the end turns 236 to the cooling medium 286, the end turns 236 may be configured to maximize surface area that may come in contact with the cooling medium 286. In some configurations, one or more channels or grooves may be formed on the surface of the end turns 236. The channels may be formed during assembly of the electric machine 200. The channels may traverse the conductors 234, the binding elements 252, and the insulating elements 250. The channels may be formed in the end turns 236 by re-routing, displacing, or removing portions of the conductors 234, insulating elements 250 and binding elements 252. For example, the end turns 236 may be placed in an apparatus (e.g., a hydraulic press). The channels may be configured to direct the cooling medium 286 that is deposited on the end turns 236 to flow in a predetermined path. Further, the channels may be configured to control the amount of time the cooling medium 286 is in contact with the end turns 236. By controlling the path and flow time of the cooling medium 286, cooling performance may be optimized.

Figure 6:
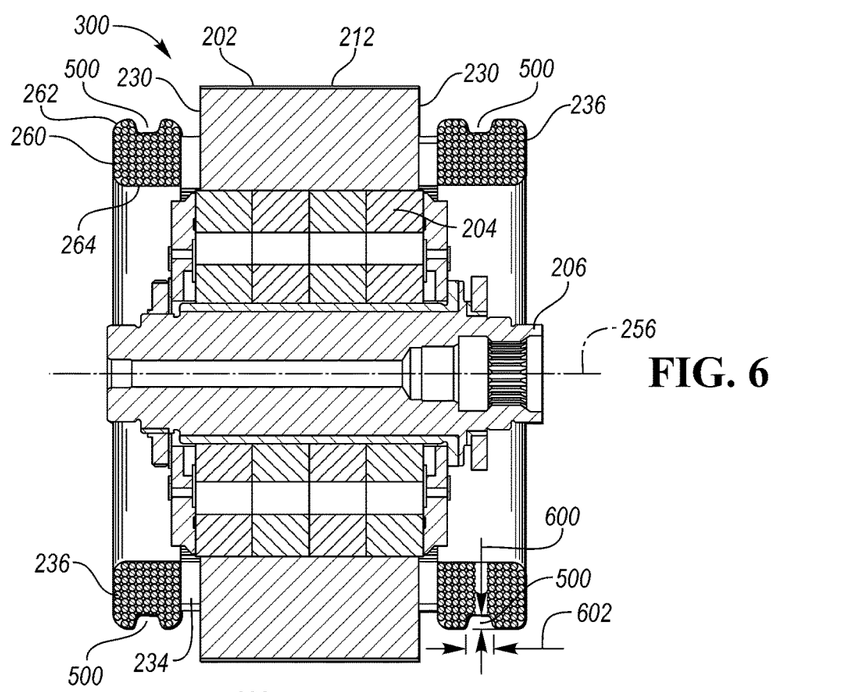
FIG. 6 is a side view, in cross section, of an electric machine with a channel defined in an outer-circumferential surface of the end turns.
Figure 7:
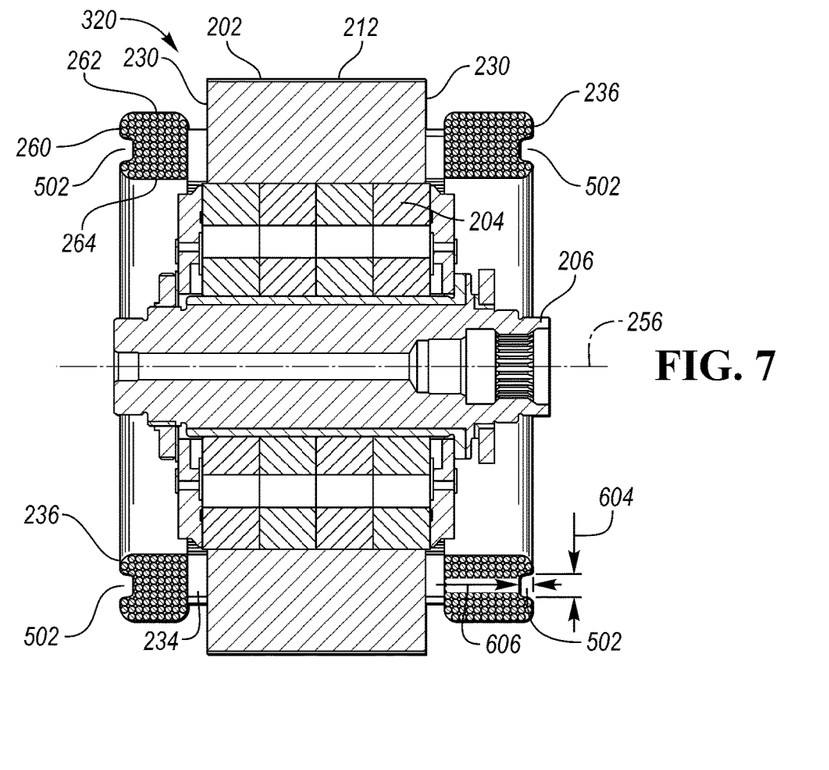
FIG. 7 is a side view, in cross section, of an electric machine with a channel defined in an annular surface of the end turns.
Figure 8:
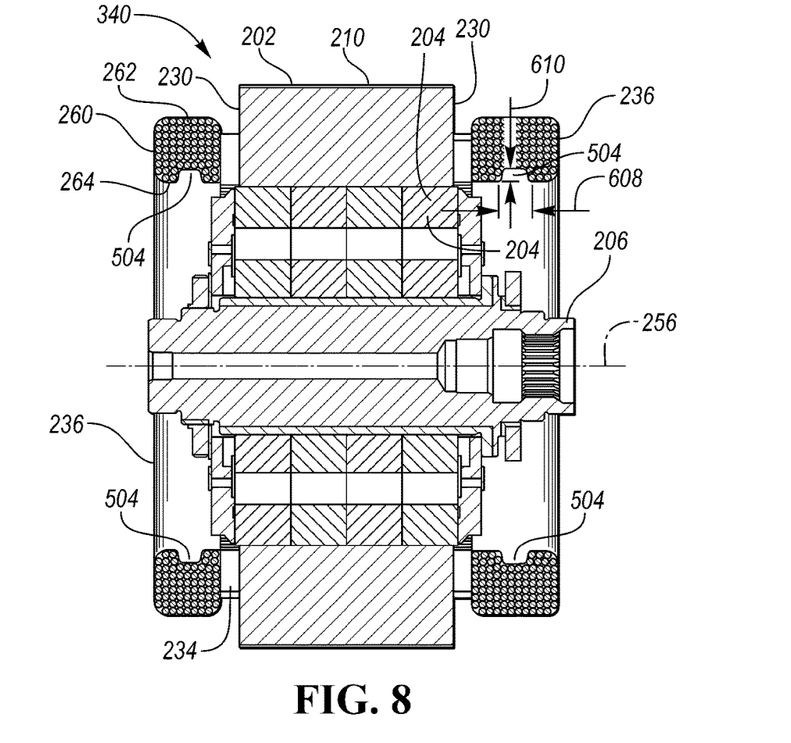
FIG. 8 is a side view, in cross section, of an electric machine with a channel defined in an inner-circumferential surface of the end turns.

FIGS. 6-8 depict cross-sectional views of several possible configurations of end-turn channels. FIG. 6 depicts a first electric machine configuration 300 that includes a single outer-circumference channel 500 that is formed in the outer-circumferential surface 262 of the end turns 236. The outer-circumference channel 500 may traverse the entire circumference of the outer-circumferential surface 262. In some configurations, the outer-circumference channel 500 may traverse only a portion of the outer-circumferential surface 262. An outer-circumference channel depth 600 may be defined as a distance between the outer-circumference surface 262 and a channel floor. The outer-circumference channel depth 600 may be generally constant along a length of the outer-circumference channel 500. In some configurations, the outer-circumference channel depth 600 may vary along the length of the outer-circumference channel 500. For example, in configurations in which the outer-circumference channel 500 traverses only a portion of the outer-circumferential surface 262, the outer-circumference channel depth 600 may be tapered or decreased at ends of the outer-circumference channel 500 to prevent pooling of the cooling medium 286. An outer-circumference channel width 602 may be defined as a distance across the outer-circumference channel 500 at the outer-circumference surface 262. The outer-circumference channel width 602 may be generally constant along the length of the outer-circumference channel 500. In some configurations, the outer-circumference channel width 602 may vary along the length of the outer-circumference channel 500. FIG. 6 depicts a single outer-circumference channel 500 but additional channels may be formed such that there is a plurality of outer-circumference channels along the outer-circumferential surface 262.

FIG. 7 depicts a second electric machine configuration 320 that includes a single annular channel 502 that is formed in the annular surface 260 of the end turns 236. The annular channel 502 may traverse the entire circumference of the annular surface 260 (e.g., transcribes a circle on the annular surface 260). In some configurations, the annular channel 502 may traverse only a portion of the circumference of the annular surface 260. An annular channel depth 606 may be defined as a distance between the annular surface 260 and a channel floor. The annular channel depth 606 may be generally constant along the entire length of the annular channel 502. In some configurations, the annular channel depth 606 may vary along the length of the annular channel 502. An annular channel width 604 may be defined as a distance across the annular channel 502 at the annular surface 260. The annular channel width 604 may be generally constant along the length of the annular channel 502. In some configurations, the annular channel width 604 may vary along the length of the annular channel 502. FIG. 7 depicts a single annular channel 502 but additional channels may be formed such that there is a plurality of annular channels along the outer-circumference surface 262.

FIG. 8 depicts a third electric machine configuration 340 that includes a single inner-circumference channel 504 that is formed in the inner-circumferential surface 264 of the end turns 236. The inner-circumference channel 504 may traverse the entire circumference of the inner-circumferential surface 264. In some configurations, the inner-circumference channel 504 may traverse only a portion of the circumference of the inner-circumferential surface 264. An inner-circumference channel depth 610 may be defined as a distance between the inner-circumference surface 264 and a channel floor. The inner-circumference channel depth 610 may be generally constant along a length of the inner-circumference channel 504. In some configurations, the inner-circumference channel depth 610 may vary along the length of the inner-circumference channel 504. An inner-circumference channel width 608 may be defined as a distance across the inner-circumference channel 504 at the inner-circumference surface 264. The inner-circumference channel width 608 may be generally constant along the length of the inner-circumference channel 504. In some configurations, the inner-circumference channel width 608 may vary along the length of the inner-circumference channel 504. FIG. 8 depicts a single inner-circumference channel 504 but additional channels may be formed such that there is a plurality of inner-circumference channels along the inner-circumference surface 264.

A width associated with any of the formed channels (e.g., 602, 604, 608) may vary across the length of the associated channel. For example, a thermal analysis of the end turns 236 may identify expected hot spots on the end turns 236. The channels (e.g., 500, 502, 504) may be configured to have an increased width at the identified hot spots to provide more contact with the cooling medium 286. For channels that do not extend completely around the circumference, the channel depth may be tapered at the ends. That is, the channel depth slopes from the end turn surface at each end of the channel. Adjusting the channel depth may control the amount of time that the cooling medium 286 is in contact with the end turns 236 allowing more or less time for heat to be transferred to the cooling medium 286.

The depth associated with any of the formed channels (e.g., 600, 606, 610) may vary based on the relative position along the end turns 236. For example, some portions of the end turns 236 may be better cooled with a deeper channel. Other portions may be configured with a shallower channel to facilitate faster movement of the cooling medium 286 across the end turns 236. The depth to which the channels are formed may be determined based on a thermal analysis of the electric machine. The thermal analysis may provide a thermal profile of the electric machine that identifies the expected worst-case temperatures at various locations of the electric machine, including the end turns 236.

Figure 9:
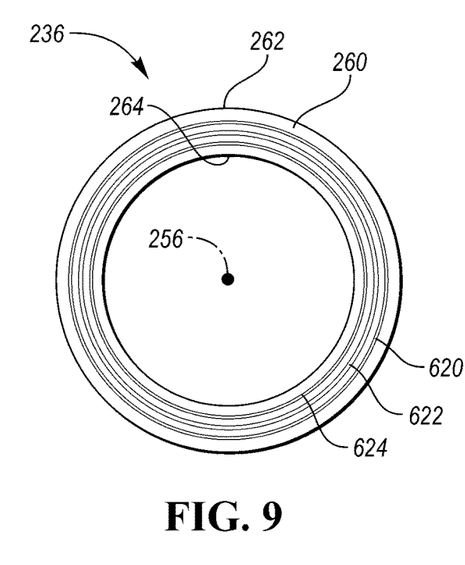
FIG. 9 is a top view of an annular surface of the end turns of an electric machine in which multiple channels at different radial distances are defined.

On any of the end-turn surfaces, the channels may be defined as continuous channels about the entire circumference of the surface. For example, on the annular surface 260, the channels may be defined as continuous channels along the annular surface 260. For example, the channels may form concentric circles on the annular surface 260. FIG. 9 depicts an end-turn channel configuration having multiple annular channels. A first channel 620 may be formed in the annular surface 260 at a first radial position relative to the central axis 256. A second channel 622 may be formed in the annular surface 260 at a second radial position relative to the central axis 256. A third channel 624 may be formed in the annular surface 260 at a third radial position relative to the central axis 256.

Figure 10:
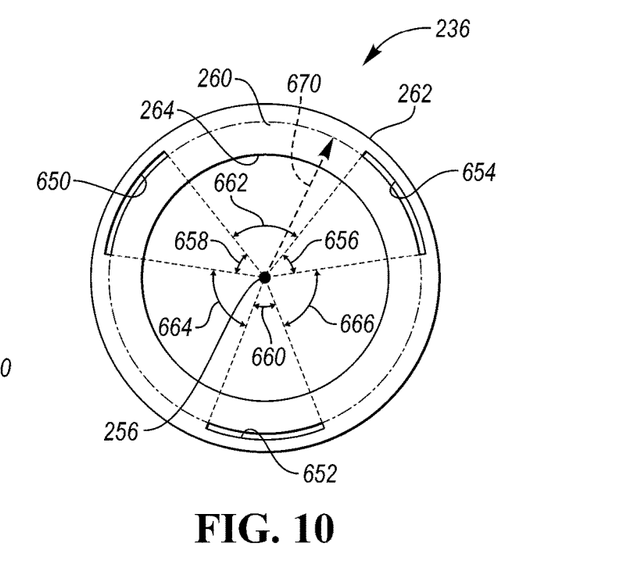

In some configurations, the channels may traverse a predetermined arc length with gaps between channels (e.g., non-continuous channels) at a given radial distance from the central axis. FIG. 10 depicts a configuration having non-continuous channels defined in the annular surface 260 at a predetermined radial distance 670 from the central axis 256. A first channel 650 may be formed in the annular surface 260 at the predetermined radial distance 670 from the central axis 256. The first channel 650 may be an arc shape that spans a first angle 658. A second channel 652 may be formed in the annular surface 260 at the predetermined radial distance 670 from the central axis 256. The second channel 652 may be an arc shape that spans a second angle 660. A third channel 654 may be formed in the annular surface 260 at the predetermined radial distance 670 from the central axis 256. The third channel 654 may be an arc shape that spans a third angle 656. A first gap angle 664 may define the arc length between the first channel 650 and the second channel 652. A second gap angle 666 may define the arc length between the second channel 652 and the third channel 654. A third gap angle 662 may define the arc length between the first channel 650 and the third channel 654. In some configurations, the first angle 658, the second angle 660 and the third angle 656 may be equal such that the first channel 650, the second channel 652 and the third channel 654 traverse equal arc lengths along the annular surface 260. In addition the first gap angle 664, the second gap angle 666, and the third gap angle 662 may be equal so that the first channel 650, the second channel 652 and the third channel 654 are equally spaced apart. In other configurations, the first gap angle 664, the second gap angle 666, and the third gap angle 662 may be different so that there is different spacing between the channels. In other configurations, the first angle 658, the second angle 660 and the third angle 656 may be different such that the first channel 650, the second channel 652 and the third channel 654 traverse unequal arc lengths along the annular surface 260. In addition, the first channel 650, the second channel 652, and the third channel 654 may be defined at different radial distances from the central axis 256.

The depictions of FIGS. 9-10 relating to the annular surface 260 apply in the same manner to the outer-circumference surface 262 and the inner-circumference surface 264. That is, multiple channels may also be formed along the outer-circumference surface 262 and the inner-circumference surface 264. For example, channels may be defined at different axial positions about the corresponding surface. That is, channels may be formed generally parallel to one another along the circumferential surface. In other configurations, one or more of the channels may traverse a non-linear path in some portions of the circumference. For example, at a predetermined section of the outer-circumference, the channel may form a zig-zag pattern to increase fluid contact in the predetermined section. In addition, non-contiguous channels may be formed along the outer-circumference surface 262 and the inner-circumference surface 264. That is, the channels may be interrupted as they traverse the circumferential surface.

Figure 11:
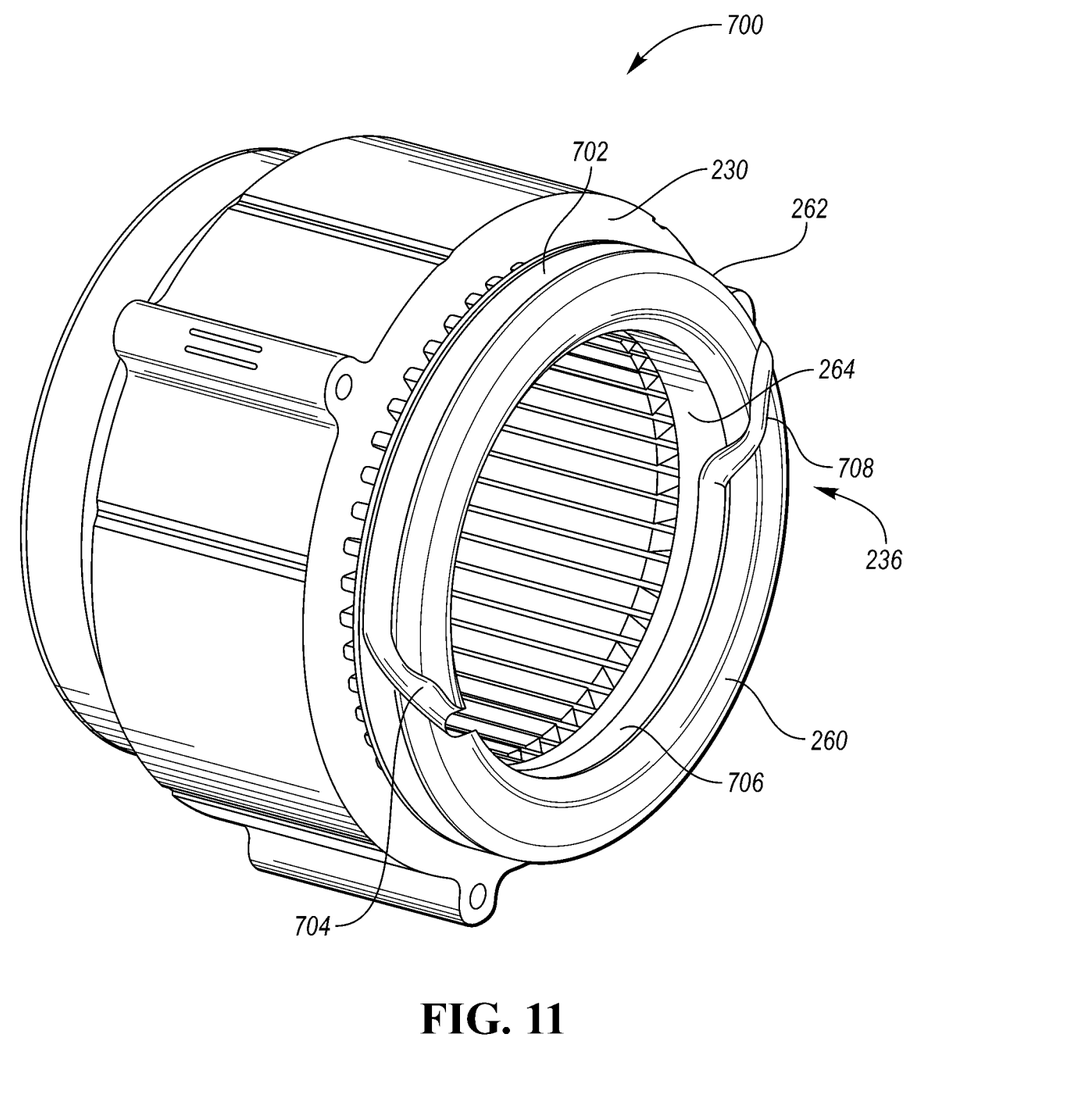
FIG. 11 is a perspective view of a stator of an electric in which a serpentine channel is defined in the end turns.

FIG. 11 depicts a stator configuration 700 in which the end turns 236 define a serpentine channel. The serpentine channel may traverse a surface that includes an outer arcuate surface of the end turns, a portion of an annular surface of the end turns, and an inner arcuate surface of the end turns. The outer arcuate surface may represent an arc length of the outer-circumferential surface 262. The inner arcuate surface may represent an arc length of the inner-circumferential surface 264. The serpentine channel may be configured to direct the cooling medium from the outer arcuate surface across the portion of the annular surface to the inner arcuate surface. The serpentine channel may be configured to traverse at least part of each of the outer-circumferential surface 262, the annular surface 260, and the inner-circumferential surface 264.

In some configurations, a serpentine channel may be defined that extends from the outer-circumferential surface 262 to the inner-circumferential surface 264. The serpentine channel may be comprised of a first channel segment 702 (e.g., formed in the outer arcuate surface) that traverses a portion of the outer-circumferential surface 262. The serpentine channel may be further comprised of a second channel segment 706 (e.g., formed in the inner arcuate surface) that traverses a portion of the inner-circumferential surface 264. The serpentine channel may be further comprised of a third channel segment 704 and a fourth channel segment 708 (e.g., formed in a portion of the annular surface) that traverse the annular surface 260. The first channel segment 702 may be defined on a topmost portion of the outer-circumferential surface 262. The first channel segment 702 may be configured to direct the cooling medium 286 along the outer-circumferential surface 262 toward the third channel segment 704 and the fourth channel segment 708. The first channel segment 702 may be defined such that at each end of the segment, the channel is directed toward the annular surface 260. The third channel segment 704 and the fourth channel segment 708 may traverse across the annular surface 260 between the outer-circumferential surface 262 and the inner-circumferential surface 264. The third channel segment 704 and the fourth channel segment 708 may be located such that cooling medium 286 is received from the first channel segment 702. The second channel segment 706 may be defined such that at each end of the segment, cooling medium 286 is received from the third channel segment 704 and the fourth channel segment 708.

In this configuration, the cooling medium 286 may be deposited (e.g., dripped or sprayed) on the topmost outer-circumferential surface 262 of the end turns 236. The cooling medium 286 may then flow through the first channel segment 702 in the outer-circumferential surface 262, through the third channel segment 704 and the fourth channel segment 708 defined in the annular surface 260 and to the second channel segment 706 defined in the inner-circumferential surface 264. The third channel segment 704 and the fourth channel segment 708 defined in the annular surface 260 may be downward sloping to facilitate flow of the cooling medium 286. That is, the channel segments may begin at a first angle at the outer-circumferential surface 262 and end at a second angle at the inner-circumferential surface 264. The specific configuration for the serpentine channel may depend on the expected orientation of the electric machine. The placement of the segments that make up the serpentine channel may be configured so that gravity aids the flow of the cooling medium 286 along the channel.

The serpentine channel may be configured as a continuous channel that traverses each of the surfaces of the end turns 236. The serpentine channel allows the cooling medium 286 to flow across each of the surfaces. For example, the first channel segment 702 may be formed in the outer-circumferential surface 262 in a topmost side (e.g., highest point relative to the ground) of the end turns 236. The topmost position may be dependent upon the actual mounting of the electric machine in the vehicle. The first channel segment 702 may traverse the outer-circumferential surface 262 for a predetermined arc length of the outer-circumferential surface 262 (e.g., outer arcuate surface). The first channel segment 702 may then be routed toward the annular surface 260. The third channel segment 704 and the fourth channel segment 708 may be formed on the annular surface 260 such that the cooling medium 286 may flow through the channel segments across the annular surface 260 toward the inner-circumferential surface 264. The second channel segment 706 may be formed in the inner-circumferential surface 264. The second channel segment 706 may traverse a predetermined arc length of the inner-circumferential surface 264 (e.g., inner arcuate surface).

An advantage of the addition of channels to the end turns 236 is that cooling performance of the electric machine may be improved. The channels form a predictable path over which the cooling medium flows over the end turns 236. Prior end turn designs do not include these intentional channels and cannot ensure that the cooling medium flows predictably across the surface. In addition, incorporating the channels into the end turns 236 does not require extra components. Overall, the thermal performance of the electric machine is improved by incorporating the channels into the end turns.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electric machine comprising:
a stator including a core having an end face and a plurality of conductors forming windings that extend adjacent to the end face and defining end turns having a toroidal outline including an annular surface that is generally parallel to the end face, the end turns formed to define at least one channel that traverses the conductors along the annular surface for increasing surface area and directing a flow of fluid.

2. The electric machine of claim 1 wherein the end turns further include insulating elements and binding elements disposed in contact with at least some of the conductors such that the at least one channel traverses at least a portion of one or more of the conductors, the binding elements, and the insulating elements.

3. The electric machine of claim 1 wherein the toroidal outline is defined in part by an outer-circumferential surface that is a surface of the toroidal outline generally furthest from a central axis of the stator and generally perpendicular to the end face, and wherein at least one other channel is defined in the outer-circumferential surface.

4. The electric machine of claim 1 wherein the toroidal outline is defined in part by an inner-circumferential surface that is a surface of the toroidal outline generally closest to a central axis of the stator and generally perpendicular to the end face, and wherein at least one other channel is defined in the inner-circumferential surface.

5. The electric machine of claim 1 wherein the toroidal outline is defined by an outer-circumferential surface and an inner-circumferential surface that are generally concentric to one another and perpendicular to the end face, and wherein the at least one channel is defined such that the at least one channel traverses the outer-circumferential surface, the annular surface, and the inner-circumferential surface.

6. The electric machine of the claim 1 wherein the at least one channel transcribes a circle on the annular surface.

7. An electric machine comprising:
a stator including a core defining an end face, a plurality of conductors forming windings that extend adjacent to the end face and defining end turns having an annular surface generally parallel to the end face, and insulating elements and binding elements disposed in contact with the conductors, wherein the end turns are formed to define at least one channel that traverses the annular surface that includes the conductors, the insulating elements, and the binding elements.

8. The electric machine of claim 7 wherein the end turns are further formed to define at least one other channel in an outer-circumferential surface that is generally perpendicular to the end face and generally furthest from a central axis of the stator.

9. The electric machine of the claim 7 wherein the end turns are further formed to define at least one other channel in an inner-circumferential surface that is generally perpendicular to the end face and generally closest to a central axis of the stator.

10. The electric machine of claim 7 wherein the end turns defines a surface that includes an outer arcuate surface of the end turns, a portion of the annular surface of the end turns, and an inner arcuate surface of the end turns, and wherein the end turns are formed to define a serpentine channel that is configured to direct fluid from the outer arcuate surface across the portion of the annular surface to the inner arcuate surface.

11. The electric machine of claim 10 wherein the outer arcuate surface is a topmost surface of the end turns, and wherein the inner arcuate surface is located below the topmost surface such that gravity aids movement of fluid from the outer arcuate surface to the inner arcuate surface.

* * * * *